United States Patent
Eskilsson et al.

(10) Patent No.: US 8,071,067 B2
(45) Date of Patent: Dec. 6, 2011

(54) PROCESSES FOR MAKING STABLE FERRIC CHLORIDE SOLUTIONS

(75) Inventors: Krister Eskilsson, Landskrona (SE); Jeff Campbell, Lakeland, FL (US); Stig Gunnarsson, Helsingborg (SE); Jan Pavlicek, Detroit, MI (US)

(73) Assignee: Kemira Water Solutions, Inc., Lakeland, FL (US)

( * ) Notice: Subject to any disclaimer, the term of this patent is extended or adjusted under 35 U.S.C. 154(b) by 361 days.

(21) Appl. No.: 12/471,865

(22) Filed: May 26, 2009

(65) Prior Publication Data

US 2010/0301255 A1  Dec. 2, 2010

(51) Int. Cl.
C01G 49/10 (2006.01)
(52) U.S. Cl. .... 423/493; 423/481; 423/488; 423/DIG. 1
(58) Field of Classification Search .......... 423/481, 423/488, 493, DIG. 1
See application file for complete search history.

(56) References Cited

U.S. PATENT DOCUMENTS

| | | |
|---|---|---|
| 2,096,855 A | 10/1937 | Ladd |
| 3,873,678 A | 3/1975 | McCormick et al. |
| 4,066,748 A | 1/1978 | Lietard et al. |
| 4,248,851 A | 2/1981 | Kovacs |
| 5,118,489 A | 6/1992 | Clair et al. |
| 5,227,010 A | 7/1993 | Lubert et al. |
| 5,300,268 A | 4/1994 | Van Diest et al. |
| 5,422,091 A | 6/1995 | Clair et al. |
| 5,547,637 A | 8/1996 | Clair et al. |
| 6,902,700 B2 * | 6/2005 | Lim et al. ............... 422/416 |
| 6,923,947 B2 | 8/2005 | Rutkowski et al. |
| 2003/0211031 A1 * | 11/2003 | Temyanko ............ 423/493 |
| 2004/0014989 A1 * | 1/2004 | Hassick et al. ........ 549/211 |

FOREIGN PATENT DOCUMENTS

| | | |
|---|---|---|
| BE | 874883 | 7/1979 |
| BE | 1011575 A3 | 11/1999 |
| BR | 9200748 A | 6/1992 |
| DE | 99972 A1 | 9/1973 |
| DE | 110481 A2 | 12/1974 |
| EP | 0340069 A1 | 4/1989 |
| EP | 0723935 A1 | 1/1996 |
| EP | 968961 A2 | 1/2000 |
| FR | 2704849 A1 | 5/1993 |
| FR | 2795747 A3 * | 1/2001 |
| GB | 734081 | 7/1955 |

(Continued)

OTHER PUBLICATIONS

International Search Report; Date of Mailing: Aug. 26, 2010 for International Application No. PCT/US2010/035931, 6 pages.

(Continued)

Primary Examiner — Ngoc-Yen Nguyen
(74) Attorney, Agent, or Firm — Thomas, Kayden, Horstemeyer & Risley, LLP

(57) ABSTRACT

Processes for forming ferric chloride solutions that are stable at relatively low temperatures and suitable for transportation without precipitation are provided. The stable ferric chloride solutions have an iron content of about 16 to about 23 weight percent and a hydrochloric acid content of about 11 to about 17 weight percent, wherein the ferric chloride solution is a stable solution and/or reversibly freezes at −10° C. Also disclosed are processes for reconstituting the stable ferric chlorides solutions to provide a final iron content of 10 to 14 weight percent and lower the concentration of hydrochloric acid contained therein.

21 Claims, 1 Drawing Sheet

FOREIGN PATENT DOCUMENTS

| | | | |
|---|---|---|---|
| JP | 6259532 | * | 3/1978 |
| JP | 1014116 A | | 1/1989 |
| JP | 03045517 | | 2/1991 |
| JP | 03170337 A | * | 7/1991 |
| JP | 2000264640 | | 9/2000 |
| RO | 121639 | | 3/2006 |
| SU | 1054303 A1 | | 11/1983 |
| SU | 1257057 A1 | | 9/1986 |

OTHER PUBLICATIONS

Written Opinion; Date of mailing: Aug. 26, 2010; for International Application No. PCT/US2010/035931; 6 pages.

* cited by examiner

PROCESSES FOR MAKING STABLE FERRIC CHLORIDE SOLUTIONS

BACKGROUND

The present disclosure generally relates to ferric chloride solutions, and more particularly, to processes for making stable ferric chloride solutions suitable for transport thereof, wherein the iron content in these solutions is about 16 to about 23 weight percent and does not precipitate at temperatures greater than −10° C.

Aqueous solutions of ferric chloride ($FeCl_3$) are commonly used as flocculating agents for treatment of water, for hydrogen sulfide control, struvite control, sludge conditioning, color removal, phosphate removal, heavy metal removal, lime softening applications, and the like. For water treatment applications, the trivalent iron functions exceptionally well for both potable and wastewater clarification. Solutions containing ferric chloride can be prepared in a variety of ways. For example, ferric chloride solutions can be produced by oxidation of ferrous chloride using oxygen ($O_2$) or chlorine ($Cl_2$); by dissolution of ferric oxide with hydrochloric acid; and the like. These iron solutions are typically supplied with an iron concentration about 10 to about 14 weight percent because at iron concentrations greater than 15% by weight, precipitation can result especially when the ferric chloride solution is subjected to relatively low temperatures of about 0° C. or less.

Moreover, because many of the processes for manufacturing ferric chloride use hydrochloric acid as a reagent in the reaction, precipitation can result at even lower iron concentrations depending on the concentration of hydrochloric acid in the final ferric chloride solution. For example, the reaction of ferric oxide with hydrochloric acid to form ferric chloride can be quantified as follows:

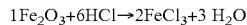

$$1Fe_2O_3 + 6HCl \rightarrow 2FeCl_3 + 3 H_2O$$

The hydrochloric acid and ferric oxide react to form reaction products including ferric chloride, water, and residuals including unreacted hydrochloric acid and unreacted ferric oxide. The amount of unreacted hydrochloric acid in the product is typically on the order of a few weight percent at most. As shown in prior art FIG. 1, the phase behavior at 0° C. of a ferric chloride, hydrochloric acid, and water system is such that the maximum iron content in solution decreases as a function of increasing hydrochloric acid up to an excess of about 15 weight percent hydrochloric acid.

In view of economies of scale, it would be desirable to maximize the amount of trivalent iron content available in ferric chloride solutions and provide high iron content ferric chloride solutions that are stable during transportation from one location to another location, especially if subjected to relatively low temperatures. Accordingly, it would be desirable and a significant commercial advantage to define a process and solution composition that provides a stable ferric chloride solution with increased iron content.

BRIEF SUMMARY

Disclosed herein are processes for stabilizing a ferric chloride solution and processes for reconstituting the stable ferric chloride solutions. In one embodiment, a process for stabilizing a ferric chloride solution comprises evaporating water from a ferric chloride solution to increase an iron content and decrease a hydrochloric acid concentration; and exposing the ferric chloride solution to gaseous hydrochloric acid in an amount effective to decrease the iron content and increase the hydrochloric acid concentration, wherein the final iron content is 16 to 23 weight percent and the free hydrochloric acid concentration is 11 to 17 weight percent, and wherein the ferric chloride solution is a stable solution and/or reversibly freezes at −10° C.

In another embodiment, the process for forming a stable ferric chloride solution comprises mixing an iron material with liquid hydrochloric acid and gaseous hydrochloric acid to form a ferric chloride solution with an iron content of about 16 to about 23 weight percent and a hydrochloric acid content of about 11 to about 17 weight percent, wherein the ferric chloride solution is a stable solution and/or reversibly freezes at temperatures greater than −10° C.

A process for reconstituting an aqueous ferric chloride solution having an iron content of about 16 to about 23 weight percent and the hydrochloric acid concentration of about 11 to about 17 weight percent comprises diluting the aqueous ferric chloride solution to reduce the iron content; mixing the dilute aqueous ferric chloride solution with a ferrous ion containing pickling liquor; and oxidizing to form a ferric chloride solution having less than 2 percent by weight hydrochloric acid concentration and about 10 to about 14 weight percent ferric iron content.

In another embodiment, the process for reconstituting an aqueous ferric chloride solution having an iron content of about 16 to about 23 weight percent and the hydrochloric acid concentration of about 11 to about 17 weight percent, comprises diluting the ferric chloride solution; and adding an iron containing material to the ferric chloride solution in an amount effective to decrease the hydrochloric acid concentration to less than 2 percent by weight of the ferric chloride solution and increase the ferric iron content to about 10 to about 14 weight percent.

In yet another embodiment, the process for reconstituting an aqueous ferric chloride solution having an iron content of about 16 to about 23 weight percent and the hydrochloric acid concentration of about 11 to about 17 weight percent comprises evaporating HCl from the ferric chloride solution to concomitantly reduce the HCl concentration to less than 5 weight percent and increase the iron content in the ferric chloride solution; and diluting the ferric chloride solution to decrease the iron content to about 10 to about 14 weight percent and the hydrochloric acid to less than 2 weight percent.

In still another embodiment, a process for forming a stable ferric chloride solution comprises mixing an iron material with ferrous and/or ferric chloride solution and gaseous hydrochloric acid to form a ferrous and/or ferric chloride solution with an iron content of about 16 to about 23 weight percent and a hydrochloric acid content of about 11 to about 17 weight percent, wherein the ferric chloride solution is a stable solution and/or reversibly freezes at temperatures greater than −10° C.

The disclosure may be understood more readily by reference to the following detailed description of the various features of the disclosure and the examples included therein.

BRIEF DESCRIPTION OF THE DRAWINGS

Referring now to the figures wherein the like elements are numbered alike.

DETAILED DESCRIPTION

Disclosed herein are processes for forming ferric chloride solutions having an iron content of about 16 to about 23 weight percent that do not precipitate at temperatures greater than −10° C. The ferric chloride solutions are stable and well suited for transportation between locations.

Figure 1:
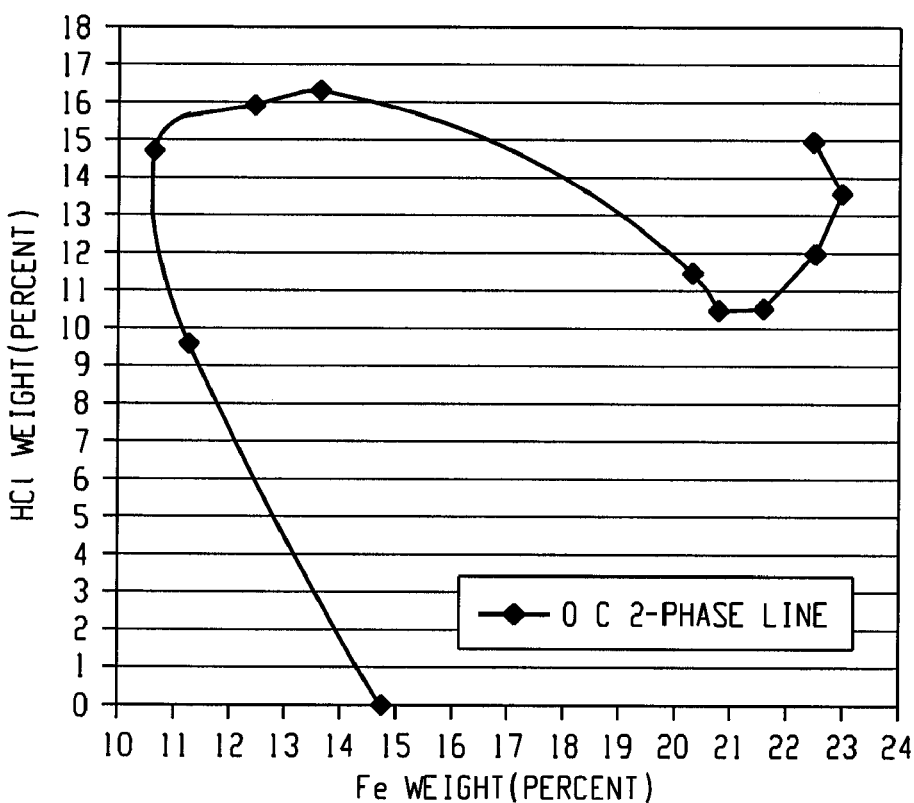
FIG. 1 graphically illustrates phase behavior of a ferric chloride, hydrochloric acid and water system at −0° C.

FIG. 1 graphically illustrates a phase diagram of a ferric chloride, hydrochloric acid (also referred to herein as HCl), and water system at 0° C. As shown, the stability line at 0° C. shows that as the amount of hydrochloric acid is increased from zero up to about 16 weight percent, the solubility of iron in the ferric chloride solution as a function of weight percent is decreased. In other words, the solubility of iron in the ferric chloride solution decreased from about 15 weight percent iron to about 11 weight percent iron upon increasing hydrochloric acid concentration up to about 16 weight percent. At hydrochloric acid concentrations greater than 16 weight percent, the ferric chloride solutions were stable for iron concentrations greater than 15 weight percent. The phase diagram illustrates that ferric chloride solutions stable at 0° C. are provided at hydrochloric acid concentrations of about 11 to about 17 weight percent, wherein the iron content is at about 16 to about 23 weight percent.

Figure 2:
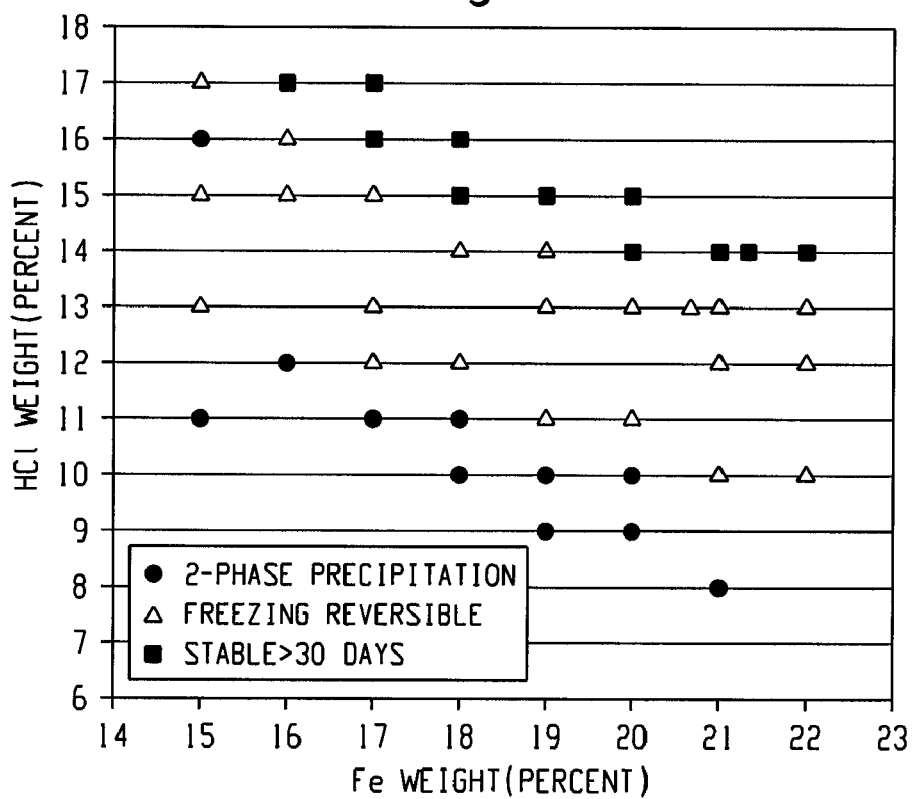
FIG. 2 graphically illustrates various experimental ferric chloride solutions that exhibited stability, reversible freezing, and 2-phase precipitation.

While not wanting to be bound by theory, it is believed that a similar phase behavior will exist at −10° C. Referring now to FIG. 2, there is graphically shown precipitation behavior at −10° C. for various ferric chloride solutions, which is consistent with the phase behavior observed at 0° C. in FIG. 1. FIG. 2 illustrates actual data points for various ferric chloride solutions that exhibited solution stability for greater than 30 days, reversible freezing, and precipitation at −10° C. Similar to that observed in FIG. 1, less HCl by weight percent was needed to provide solution stability or reversible freezing as the iron weight percent content was increased from 15 weight percent to 21 weigh percent.

It should also be noted that there are regions of hydrochloric acid concentrations shown in FIG. 2 where the ferric chloride solution reversibly freezes at −10° C., which can be used to expand the range of available iron content and hydrochloric acid concentrations for transportation in tanks or railway cars such that ferric chloride salt precipitation is avoided at temperatures of about −10° C. or greater. Clearly, the samples in the phase region that leads to reversibly frozen ferric chloride solutions have different kinetic properties depending on the concentration of HCl in the ferric chloride solution.

The present disclosure details methods that provide stable ferric chloride solutions and/or solutions that are reversibly frozen at −10° C. having the iron concentration at about 16 to about 23 weight percent with hydrochloric acid of about 11 to about 17 weight percent, thereby providing high trivalent iron content ferric chloride solutions that are stable during transportation at relatively low temperatures. These stable solutions can then be reconstituted on-site.

In one embodiment, the process generally includes evaporating water from a ferric chloride solution to increase the iron content to a desired amount, e.g., greater than the above noted target amounts, and then exposing the ferric chloride solution to gaseous hydrochloric acid in an amount effective to decrease the iron content to the target amount and increase the free hydrochloric acid concentration, wherein the final iron content is about 16 to about 23 weight percent and the free hydrochloric acid concentration is about 11 to about 17 weight percent. Evaporation increases the iron content and concomitantly removes a portion of the hydrochloric acid and water. Optionally, the ferric chloride solution is first provided by oxidizing a ferrous chloride solution such a ferrous chloride containing pickling liquor. The iron content and the free hydrochloric acid concentration are selected so as to provide a ferric chloride solution that is a stable solution and/or reversibly freezes at −10° C. In this manner, the ferric chloride solution with the desired iron content and hydrochloric acid concentration can be safely transported from one location to another location without precipitation at relatively low temperatures.

In another embodiment, solid iron containing materials are first mixed with liquid HCl and then gaseous HCl is added to increase dissolution of the solid iron containing materials to provide an iron content of about 16 to about 23 weight percent and a free hydrochloric acid concentration is about 11 to about 17 weight percent. The solid iron containing materials may be ferric and/or ferrous materials. Dissolution of the solid iron material, similar to HCl(g) absorption, is exothermic. Suitable solid iron materials include, without limitation, iron, scrap iron, iron ore (e.g., hematite, magnetite, limonite, and the like), all industrial formed iron oxides, and the like. Optionally, instead of a solid iron containing material, pickling liquors can be used that contain high amounts of iron, and the like. Again, the pickling liquors may include ferrous salts, ferric salts, or mixtures thereof The pickling liquor may be concentrated such as by distillation to increase the iron content, if desired.

In another embodiment, solid ferrous containing materials are mixed with liquid HCl and gaseous HCl. The ferrous ions are subsequently oxidized to ferric ions so as to provide a stable ferric chloride solution having an iron content of about 16 to about 23 weight percent and a free hydrochloric acid concentration is about 11 to about 17 weight percent. In some embodiments, oxidation may occur prior to contact with the gaseous HCl.

In yet another embodiment, solid iron containing materials are mixed with ferrous and/or ferric chloride solution and gaseous hydrochloric acid to form a ferrous and/or ferric chloride solution with an iron content of about 16 to about 23 weight percent and a hydrochloric acid content of about 11 to about 17 weight percent, wherein the ferric chloride solution is a stable solution and/or reversibly freezes at temperatures greater than −10° C. The ferrous ions contained therein can be oxidized prior to or subsequent to mixing with the iron containing material and gaseous hydrochloric acid.

In still another embodiment, a ferrous chloride hydrate of the formula $FeCl_2 \cdot XH_2O$ (e.g., dihydrate, tetrahydrate, and the like) is precipitated from the ferrous chloride picking liquor and subsequently isolated. Water or HCl or pickling liquid is then added to the ferrous chloride dihydrate to form a solution to which gaseous HCl is then introduced. The acidified ferrous chloride solution is then oxidized to form a stable ferric chloride solution having an iron content of about 16 to about 23 weight percent and a free hydrochloric acid concentration of about 11 to about 17 weight percent. Optionally, oxidation of the ferrous ions in the solution can occur prior to contact with the gaseous HCl.

It should be noted that in any of these embodiments, the starting solution can contain a mixture of ferrous and ferric ions, if desired. If ferrous ($Fe^{2+}$) ions are present, the process may further include oxidation with oxygen (or other oxidants such as, for example, $Cl_2$, $NaClO_3$, air and the like) to increase the oxidation state of the $Fe^{2+}$ to $Fe^{3+}$. With respect to oxidation with oxygen, because the stabilized ferric chloride solutions contain high ratios of HCl, it is believed that lower oxidation temperatures can be employed. The high acid concentrations appear to facilitate oxidation. For example, typically, a temperature of about 70° C.-80° C. and a pressure of 6 bars are needed to start oxidation with $O_2$, which is then increased to 120° C. to complete oxidation. However, with the high acid content present in the solution, oxidation has been observed to start at about 20° C. with a pressure as low as 3 bars and was finished at about 80° C. It should be noted that the dissolution of the solid iron material (or acidification of the pickling liquor) and the absorption of HCl gas can be done in one step, if desired. With regard to magnetite solid iron materials, dissolution can result in ferrous chloride precipitation, which can be removed by filtration and processed as noted above to form stable ferric chloride solutions.

The generation of the gaseous HCl for inclusion in the ferric chloride solutions is not intended to be limited to any particular process. For example, the HCl gas (g) can be generated by the combustion of chlorine and hydrogen on demand. Advantageously, combustion generates energy, which may also be utilized. Alternatively, it is possible to distil HCl (g) from the concentrated HCl solution. An alternative distillation process is to add $H_2SO_4$ to the concentrated HCl solution and thereby drive off HCl (g). This method will, however, generate a diluted $H_2SO_4$/HCl mixture with limited value. Alternatively, reaction of a variety of chloride salts and sulphuric acid can be used to produce HCl (g). In addition, HCl (g) as a byproduct from organic chlorination or synthesis can be used. Optionally, the ferric chloride solutions can be cooled during the exposure to the HCl (g). In one embodiment, the ferric chloride solution is cooled to less than 60° C., and in other embodiments, the ferric chloride solution is cooled to less than 50° C.

By way of example, a ferric chloride solution containing about 18.5 by weight percent of iron and hydrochloric acid at 13.6 weight percent was distilled (i.e., evaporated) to remove water such that the amount of iron by weight percent increased from 18.5 to 19.6 and the amount of free HCl in the solution decreased from 13.6 to 6.7 weight percent. The actual amounts are shown in Table 1 below.

TABLE 1

|  | $Fe^{3+}$, % | Free HCl in $FeCl_3$, % | HCl in condensate, % |
| --- | --- | --- | --- |
| Initial $FeCl_3$ | 18.5 | 13.6 |  |
| Final $FeCl_3$ | 19.6 | 6.7 | 16.1 |

Interestingly, a substantial portion of the HCl in the ferric chloride solution was distilled even when the HCl concentration in the starting ferric chloride solution was only about 14%, which is significantly below the well-known constant boiling azeotrope of 20.2% HCl for the binary mixture of HCl and water system (25° C.). While not wanting to be bound by theory, this behaviour provides a possible explanation as to why it is not possible to reach the wanted stability region for the intermediate by evaporation only. As will be discussed in greater detail below, the ferric chloride solution can then be contacted with HCl gas so as to increase the concentration of HCl in solution to about 11 to about 17 weight percent, thereby providing a stable ferric chloride solution having a final iron content of about 16 to about 23 weight percent and a hydrochloric acid concentration sufficient to maintain stability at low temperatures,. i.e., a concentration of about 11 to about 17 weight percent.

Optionally, the stable ferric chloride solutions as described above can be reconstituted on site to provide lower iron content as may be desired for some applications, e.g., about 10 to about 14 weight percent and a free hydrochloric acid less than 5 weight percent in one embodiment, less than 2 weight percent in other embodiments, and substantially eliminated (i.e., less than 0.5 weight percent) through a variety of methods in still other embodiments. Depending upon the end user specifications, these processes noted above may further include reconstituting the ferric chloride solutions by adding a liquid or solid iron containing material to the stable ferric chloride solution so as to substantially reduce the HCl concentration in the ferric chloride solution. The iron containing material utilized in this manner provides a means for consuming the hydrochloric acid within the solution and increasing the iron content.

In one embodiment, a process for reconstituting the ferric chloride solution includes diluting the ferric chloride solution to provide an iron content less than the target iron content. The added iron containing material can then be used to increase the total iron content to the desired level while decreasing the amount of free HCl. As described above, the iron containing material can be a liquid (e.g., pickling liquor) or a solid (e.g., hematite, magnetite, etc.).

In another embodiment, reconstitution can include mixing the ferric chloride solution having the iron concentration of about 16 to about 23 weight percent and the free hydrochloric acid concentration of about 11 to about 17 weight percent with ferrous sulphate ($FeSO_4.7H_2O$) and subsequently oxidizing by various methods mentioned above to $FeClSO_4$. The solution can be diluted to the desired iron concentration before or after addition of the ferrous sulphate.

In still another embodiment, reconstitution of the ferric chloride solution having the iron concentration of 16 to 23 weight percent and the free hydrochloric acid concentration of 11 to 17 weight percent can be made by mixing the ferric chloride solution with spent pickling liquor containing ferrous chloride, and subsequent oxidation with $O_2$, or other oxidant, e.g., $Cl_2$. No solid and/or liquid separation is thus needed. Reconstitution according to any of the embodiments described above may include an evaporation step to further reduce HCl concentration, if desired. As such, the procedure would make reconstituting easier compared to production from solid iron containing materials since no liquid/solid separation would be needed nor would dissolution of the iron containing material be needed.

Advantageously, the stable ferric chloride solutions with the increased iron concentration can be made available as is to end users as the more acidic product or reconstituted as discussed above to a desired iron content and free HCl concentration. The high concentration of iron in the ferric chloride solutions, and that also HCl can be transported in the same container may lead to overall lower logistics and production costs. The excess acid can be evaporated and re-absorbed in water to form a high concentration hydrochloric acid solution.

The following examples fall within the scope of, and serve to exemplify, the more generally described methods set forth above. The examples are presented for illustrative purposes only, and are not intended to limit the scope of the disclosure.

EXAMPLE 1

In this example, a ferric chloride solution having a 13.5 weight percent iron content was evaporated in a reactor to provide a concentrated ferric chloride solution having an iron content of 23.1 weight percent. Gaseous HCl was then bubbled into four liters of the iron concentrated ferric chloride solution for a period of time in order to produce a 20 weight percent iron concentrated ferric chloride solution with 13.8 weight percent HCl. An increase in temperature was observed due to dissolution enthalpy from the gaseous HCl. The ferric chloride solution behaved as a hydrochloric acid solution when absorbing gas and a decreased boiling temperature was observed with increasing HCl concentration.

EXAMPLE 2

In this example, different iron-containing materials were mixed with liquid hydrochloric acid and gaseous hydrochloric acid was added. The iron-containing materials included Hematite 1: a natural material characterized as hard to dissolve from Brasil PFCJ—Pellet Feed Carajas produced by Vale; Hematite 2: an industrial material characterized as easy to dissolve from Magnetic International, Inc. Burns Harbor, USA; and Magnetite: iron ore from Mo Rana AS Norway.

In all tests, the targeted ferric chloride solution was 20 wt % iron and 14 wt % HCl. The tests were performed in a pilot reactor heated or cooled by thermal oil. The material was added together, in grams (g), with 34% HCl solution in the reactor where the amount of acid solution was determined by the amount of water needed for the final product. After the initial mixture, the HCl gas was added at 2 bar pressure. The reaction was immediate and generated a large amount of heat both from the absorption of HCl (g) in the solution and from the dissolution of iron oxide. The experimental set up was in tracking mode so that the temperature of the oil followed the temperature in the reactor with a temperature limit of 130° C. The results of these tests are displayed in Table 2.

TABLE 2

| Dissolution with gaseous HCl | | | |
|---|---|---|---|
| | Hematite-1 | Hematite-2 | Magnetite |
| Fe material (g) | 250 | 400 | 200 |
| HCl (34%) (g) | 160 | 370 | 135 |
| HCl gas (g) | 316 | 742 | 265 |
| | 726 | 1512 | 600 |
| (g) Non-dissolved | 6.7 | 4 | — |
| % Non-dissolved | 2.68 | 1 | — |
| % Fe total | 20.3 | 19.8 | 20.4 |
| % HCl (wt/wt) | 11.3 | 13.8 | 11.7 |

The dissolution of the magnetite sample by reaction with gaseous HCl exhibited a relatively fast reaction and maximum temperature was observed within 4 minutes after the gas feeding was started. Ferrous ($Fe^{2+}$) chloride in the magnetite sample precipitated and formed a slurry where the ferrous chloride can be removed, if desired, or oxidised to ferric by conventional oxidation agents.

EXAMPLE 3

In this example, 1000 grams of a solution containing 58.1 weight percent ferric chloride and 14 weight percent HCl was added to a 1 liter externally heated round flask with a connection to a water cooled condenser and an exhaust pipe going through an absorption flask with water. 240 grams of water was then added to the absorption flask prior to the start of the evaporation.

The round flask was heated to 100° C. and the generated vapor was cooled by the condenser before being transported through the water phase of the absorption flask, thus both the HCl and water vapors ends up in the absorption flask. The heating was stopped when the flask contained 770 grams with a concentration of ferric chloride of 76 weight percent and 4 weight percent HCl. This solution was then diluted with 770 grams of water to provide 1540 grams of a ferric chloride solution containing 38 weight percent ferric chloride and 2 weight percent HCl. In the absorption flask was collected 470 grams of HCl solution containing 23 weight percent HCl.

EXAMPLE 4

In this example, ferric chloride solutions containing 20% Fe and 12.8% free HCl were reconstituted by addition of solid iron containing materials. In all experiments, the product target was 13.5% Fe and 0.5% free acid. Four different iron materials were tested:

Limonite—an industrial waste of limonite type (mixture of $Fe_2O_3$ and FeO) from Catalise Ind. E Com. De Metais Ltda.—Brasil;

Magnetite—iron ore from Compania Minera del Pacifico S, Chile;

Hematite 1: a natural material from Brasil PFCJ—Pellet Feed Carajas. Producer is Vale; and Hematite 2: an industrial material from Magnetic International, Inc., Burns Harbor, USA.

The results are shown in Table 3. In general limonite, magnetite and hematite-2 can be regarded as easy to dissolve in the high concentrated ferric solution. Hematite-1 exhibited the least solubility with the percentage of non-dissolved material more than twice that of the other iron materials. As shown, addition of the solid iron containing material and dilution reduced the HCl content to less than 5% in each instance and provided an iron ($Fe^{3+}$) content of about 14%.

TABLE 3

| Dissolution in $FeCl_3$ (20% Fe and 12.8% HCl) 2 hours boiling | | | | |
|---|---|---|---|---|
| | Limonite | Magnetite | Hematite-1 | Hematite-2 |
| Fe-mineral (g) | 9.12 | 9.937 | 9.649 | 9.649 |
| $FeCl_3$ (20% Fe and 12.8% HCl) (g) | 101.71 | 101.71 | 101.71 | 101.71 |
| HCl (37%) (g) | 2.703 | 2.703 | 2.703 | 2.703 |
| $H_2O$ (g) | 86.467 | 85.65 | 85.938 | 85.938 |
| | 200 | 200 | 200 | 200 |
| (g) Non-dissolved | 0.22 | 0.51 | 2.33 | 0.24 |
| % Non-dissolved | 2.39 | 5.11 | 24.09 | 2.51 |
| % Fe total | 13.54 | 13.72 | 13.27 | 13.68 |
| % Fe (II) | 2.05 | 1.15 | 0.32 | <0.05 |
| % HCl | 2.37 | 1.56 | 2.76 | 1.30 |

In addition to the boiling study above, Hematite-2, water, and ferric chloride solution (20% Fe and 12.8% HCl) were mixed. Upon mixing, the temperature increased from 20° C. to 62° C. Thereafter, the temperature slowly decreased back to room temperature. The final product contained 12.7 wt % Fe and 3.5 wt % HCl and had 3.5% non-dissolved Hematite-2. As such, the non-dissolved material was only slightly higher than when the sample was boiled for two hours indicating that not much more energy than the dilution heat would be needed.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A process for stabilizing a ferric chloride solution, comprising:
   a) evaporating water from a ferric chloride solution to increase an iron content and decrease a hydrochloric acid concentration; and
   b) exposing the ferric chloride solution obtained from step a) to gaseous hydrochloric acid in an amount effective to decrease the iron content and increase the hydrochloric acid concentration, wherein the final iron content is 16 to 23 weight percent and the free hydrochloric acid concentration is 11 to 17 weight percent, and wherein the ferric chloride solution resulting from step b) is a stable solution and/or reversibly freezes at −10° C.

2. The process of claim 1, wherein the final iron content is 19 to 22 weight percent and the free hydrochloric acid concentration is 13 to about 17% weight percent.

3. The process of claim 1, further comprising diluting the ferric chloride solution resulting from step b) followed by adding an iron material or adding the iron material followed by diluting the ferric chloride solution resulting from step b) in an amount effective to consume and reduce the hydrochloric acid concentration in the ferric chloride solution resulting from step b) to less than 5 percent by weight of the ferric chloride solution.

4. The process of claim 3, wherein the iron material is a solid comprising iron oxides, limonite, magnetite, hematite, and mixtures thereof.

5. The process of claim 3, wherein the iron material is a liquid comprising iron containing pickling liquor.

6. The process of claim 3, wherein the iron material comprises $Fe^{2+}$ and $Fe^{3+}$ ions, and the process further comprises oxidizing the $Fe^{2+}$ ions to $Fe^{3+}$.

7. The process of claim 1, wherein evaporating the water comprises distilling the ferric chloride solution.

8. The process of claim 1, further comprising cooling the ferric chloride solution during the exposing of the ferric chloride solution to the gaseous hydrochloric acid.

9. The process of claim 3, wherein the final iron content is about 10 to about 14 weight percent.

10. A process for forming a stable ferric chloride solution, the process comprising:
    mixing an iron material with liquid hydrochloric acid and gaseous hydrochloric acid to form a ferric chloride solution with an iron content of about 16 to about 23 weight percent and a hydrochloric acid content of about 11 to about 17 weight percent, wherein the ferric chloride solution is a stable solution and/or reversibly freezes at temperatures greater than −10° C.

11. The process of claim 10, wherein the iron material is a solid comprising iron oxide, limonite, magnetite, hematite, and mixtures thereof.

12. The process of claim 10, wherein the iron material is a liquid comprising iron containing pickling liquor.

13. The process of claim 10, wherein the iron material comprises $Fe^{2+}$ and $Fe^{3+}$ ions, and the process further comprises oxidizing the $Fe^{2+}$ ions to $Fe^{3+}$.

14. A process for reconstituting an aqueous ferric chloride solution having an iron content of about 16 to about 23 weight percent and a hydrochloric acid concentration of about 11 to about 17 weight percent, comprising:
    diluting the aqueous ferric chloride solution to reduce the iron content;
    mixing the dilute aqueous ferric chloride solution with a ferrous ion containing pickling liquor to form a mixture; and
    oxidizing the mixture to form a ferric chloride solution having less than 5 percent by weight hydrochloric acid concentration and about 10 to about 14 weight percent ferric iron content.

15. A process for reconstituting an aqueous ferric chloride solution having an iron content of about 16 to about 23 weight percent and a hydrochloric acid concentration of about 11 to about 17 weight percent, comprising:
    diluting the ferric chloride solution to reduce the iron content; and
    adding an iron containing material to the dilute ferric chloride solution in an amount effective to decrease the hydrochloric acid concentration to less than 5 percent by weight of the ferric chloride solution and increase the ferric iron content to about 10 to about 14 weight percent.

16. The process of claim 15, wherein adding the iron material to the dilute ferric chloride solution is in an amount effective to decrease the hydrochloric acid concentration to less than 2 percent by weight of the ferric chloride solution.

17. The process of claim 15, wherein the iron containing material is a solid comprising limonite, magnetite, hematite, and mixtures thereof.

18. The process of claim 15, wherein the iron containing material comprises ferrous ions, and the process further comprises oxidizing ferrous ions contained therein to ferric ions.

19. A process for reconstituting an aqueous ferric chloride solution having an iron content of about 16 to about 23 weight percent and the hydrochloric acid concentration of about 11 to about 17 weight percent, comprising:
    evaporating HCl from the ferric chloride solution to concomitantly reduce the HCl concentration and increase the iron content in the ferric chloride solution; and
    diluting the evaporated ferric chloride solution to decrease the iron content to about 10 to about 14 weight percent and the hydrochloric acid to less than 2 weight percent.

20. A process for forming a stable ferric chloride solution, the process comprising:
    mixing an iron material with ferrous and/or ferric chloride solution and gaseous hydrochloric acid to form a ferrous and/or ferric chloride solution with an iron content of about 16 to about 23 weight percent and a hydrochloric acid content of about 11 to about 17 weight percent, wherein the ferric chloride solution is a stable solution and/or reversibly freezes at temperatures greater than −10° C.

21. The process of claim 20, further comprising oxidizing ferrous ions contained therein to ferric ions prior to or subsequent to mixing with the iron containing material and gaseous hydrochloric acid.

* * * * *